US006984355B2

(12) United States Patent
Niimi et al.

(10) Patent No.: US 6,984,355 B2
(45) Date of Patent: Jan. 10, 2006

(54) SEMICONDUCTING CERAMIC MATERIAL, PROCESS FOR PRODUCING THE CERAMIC MATERIAL, AND THERMISTOR

(75) Inventors: Hideaki Niimi, Hikone (JP); Akira Ando, Omihachiman (JP); Mitsutoshi Kawamoto, Hirakata (JP); Masahiro Kodama, Shiga-ken (JP)

(73) Assignee: Murata Manufacturing Co., Ltd., (JP)

( * ) Notice: Subject to any disclaimer, the term of this patent is extended or adjusted under 35 U.S.C. 154(b) by 0 days.

(21) Appl. No.: 10/246,008

(22) Filed: Sep. 18, 2002

(65) Prior Publication Data

US 2003/0030192 A1 Feb. 13, 2003

Related U.S. Application Data

(62) Division of application No. 09/705,049, filed on Nov. 2, 2000, now abandoned.

(30) Foreign Application Priority Data

Nov. 2, 1999 (JP) ................................ 11-312532

(51) Int. Cl.
*C04B 33/32* (2006.01)

(52) U.S. Cl. ...................... 264/620; 264/614; 264/618; 156/89.14

(58) Field of Classification Search ............ 156/89.11, 156/89.12, 89.14, 89.16; 264/614, 616, 618; 501/137, 138, 139
See application file for complete search history.

(56) References Cited

U.S. PATENT DOCUMENTS 3,474,043 A * 10/1969 Andersen et al. ...... 252/519.12
3,673,119 A * 6/1972 Ueoka et al.
4,384,989 A * 5/1983 Kamigaito et al. ......... 252/516
4,535,064 A * 8/1985 Yoneda
4,571,276 A * 2/1986 Akse
H415 H * 1/1988 Newnham et al.
5,683,790 A * 11/1997 Suzuki et al. ............... 428/210
6,346,496 B2 * 2/2002 Nabika et al.
6,359,327 B1 * 3/2002 Niimi et al.
6,362,521 B1 * 3/2002 Nabika et al.
6,432,558 B1 * 8/2002 Nabika et al. .............. 428/620
6,544,443 B2 * 4/2003 Niimi et al. ............. 252/518.1
2001/0003361 A1 * 6/2001 Niimi et al.

FOREIGN PATENT DOCUMENTS

JP 1-238101 * 9/1989
JP 1-239829 * 9/1989
JP 1-239830 * 9/1989
JP 1-305855 * 12/1989
JP 2-174201 * 7/1990
JP 2-260510 * 10/1990
JP 3-35501 * 2/1991

(Continued)

OTHER PUBLICATIONS

Japanese Examination Report issued Jan. 4, 2005 (w/ English translation of relevant portions).

*Primary Examiner*—Melvin Mayes
(74) *Attorney, Agent, or Firm*—Dickstein, Shapiro, Morin & Oshinsky, LLP

(57) ABSTRACT

A $BaTiO_3$-type semiconducting ceramic material which has undergone firing in a reducing atmosphere and re-oxidation, wherein the relative density of the ceramic material after sintering is about 85–90%. A process for producing the semiconducting ceramic material of the present invention and a thermistor containing the semiconducting ceramic material are also disclosed.

18 Claims, 1 Drawing Sheet

10

FOREIGN PATENT DOCUMENTS

| | | | |
|---|---|---|---|
| JP | 3-35503 | * | 2/1991 |
| JP | 3-38802 | * | 2/1991 |
| JP | 3-38803 | * | 2/1991 |
| JP | 4-23401 | * | 1/1992 |
| JP | 4-115502 | * | 4/1992 |
| JP | 4-154661 | * | 5/1992 |
| JP | 4-154664 | * | 5/1992 |
| JP | 4-245401 | * | 9/1992 |
| JP | 5-251207 | * | 9/1993 |
| JP | 6-144926 | * | 5/1994 |
| JP | 6-181108 | * | 6/1994 |
| JP | 7-14702 | * | 1/1995 |
| JP | 8-153604 | * | 6/1996 |
| JP | 8-213205 | | 8/1996 |
| JP | 10-70007 | * | 3/1998 |
| JP | 10-294203 | * | 11/1998 |

* cited by examiner

SEMICONDUCTING CERAMIC MATERIAL, PROCESS FOR PRODUCING THE CERAMIC MATERIAL, AND THERMISTOR

This is a divisional of U.S. patent application Ser. No. 09/705,049, filed Nov. 2, 2000 now abandoned.

BACKGROUND OF THE INVENTION

1. Field of the Invention

The present invention relates to a semiconducting ceramic material, a process for producing the ceramic material and a thermistor comprising the ceramic material. More particularly, the present invention relates to a $BaTiO_3$-type semiconducting ceramic material which exhibits the characteristic of positive temperature coefficient of resistance (PTC characteristics), to a process for producing the ceramic material and to a thermistor comprising the ceramic material.

2. Background Art

Conventionally, a $BaTiO_3$-type semiconducting ceramic material is widely employed in the manufacture of PTC thermistors since the ceramic material exhibits the characteristic of positive temperature coefficient of resistance (PTC characteristics). The PTC thermistor is widely employed for the demagnetization of a cathode-ray tube or in a heater.

In order to reduce resistance, there has been keen demand for a PTC thermistor comprising a laminate which includes semiconducting ceramic materials and internal electrodes. Since a base metal such as Ni is employed to form an internal electrode of the PTC thermistor, the semiconducting ceramic material must be re-oxidized after the material is fired in a reducing atmosphere. The re-oxidation of the semiconducting ceramic material is carried out in order to obtain the PTC characteristics of the material through the re-oxidation of grain boundaries of the material.

However, it is difficult to completely re-oxidize the semiconducting ceramic material at a temperature sufficiently low to prevent oxidation of the internal electrode formed of a base metal.

In order to solve this problem, for example, Japanese Patent Application Laid-Open (kokai) No. 8-153604 discloses a process in which a material having a low firing temperature is employed as a semiconducting ceramic material. However, such a process is not necessarily satisfactory.

SUMMARY OF THE INVENTION

In view of the foregoing, an object of the present invention is to provide a $BaTiO_3$-type semiconducting ceramic material which exhibits excellent PTC characteristics, the ceramic material having undergone firing in a reducing atmosphere and re-oxidation.

Another object of the present invention is to provide a process for producing a $BaTiO_3$-type semiconducting ceramic material which exhibits excellent PTC characteristics, which process comprises firing the ceramic material in a reducing atmosphere and re-oxidizing the ceramic material.

Another object of the present invention is to provide a thermistor comprising a $BaTiO_3$-type semiconducting ceramic material which exhibits excellent PTC characteristics, the ceramic material having undergone firing in a reducing atmosphere and re-oxidation.

Accordingly, in a first aspect of the present invention, there is provided a $BaTiO_3$-type semiconducting ceramic material which has undergone firing in a reducing atmosphere and re-oxidation, wherein the relative density of the ceramic material after sintering is about 85–90%.

Relative density is the ratio of the density of a sintered ceramic to the ideal density of the ceramic which is calculated under an assumption that the ceramic consists of a perfect crystal lattice. The relative density is usually expressed in percentage.

Preferably, the size of grains constituting the matrix of a semiconducting ceramic material of the present invention is about 0.5–2 μm.

In a second aspect of the present invention, there is provided a process for producing a $BaTiO_3$-type semiconducting ceramic material, which comprises firing the ceramic material in a reducing atmosphere and re-oxidizing the ceramic material, wherein the ceramic material is fired at a temperature about 25° C. or more lower than a sintering completion temperature of the ceramic material.

Preferably, a $BaTiO_3$-type semiconducting ceramic material having a sintering completion temperature of about 1,275° C. or higher is fired at about 1,250° C. or lower.

In a third aspect of the present invention, there is provided a thermistor comprising a laminate in which a semiconducting ceramic material of the present invention and an electrode are alternately laminated.

When the semiconducting ceramic material is fired at low temperature, the density of the material after sintering can be appropriately reduced and pores through which oxygen passes during re-oxidation can be established. As a result, the semiconducting ceramic material exhibits excellent PTC characteristics.

Specifically, when the semiconducting ceramic material is fired at a temperature about 25° C. or more lower than the sintering completion temperature, the sintering completion temperature being the temperature at which the density of the material is maximized, the semiconducting ceramic material exhibits excellent PTC characteristics.

When the relative density of the semiconducting ceramic material after sintering is about 85–90%, the ceramic material exhibits excellent PTC characteristics.

The size of grains constituting the matrix of the semiconducting ceramic material is preferably about 0.5–2 μm, more preferably about 0.7–1.5 μm. In addition, the relative density of the semiconducting ceramic material after sintering is preferably about 87–89%.

In the present invention, the semiconducting ceramic can be produced from an inexpensive material used into a solid-state process instead of an expensive wet process.

The lower limit of the firing temperature of the semiconducting ceramic material is not particularly limited. However, when the firing temperature is excessively low, the resistance of the ceramic material becomes high. Therefore, in general, it is not preferable that the ceramic material is fired at a temperature about 150° C. or more lower than the sintering completion temperature.

BRIEF DESCRIPTION OF THE DRAWING

The above and other objects, features, and many of the attendant advantages of the present invention will be readily appreciated as the same becomes better understood with reference to the following detailed description of the preferred embodiments when considered in connection with an accompanying drawing, in which.

DETAILED DESCRIPTION OF PREFERRED EMBODIMENTS

Figure 1:
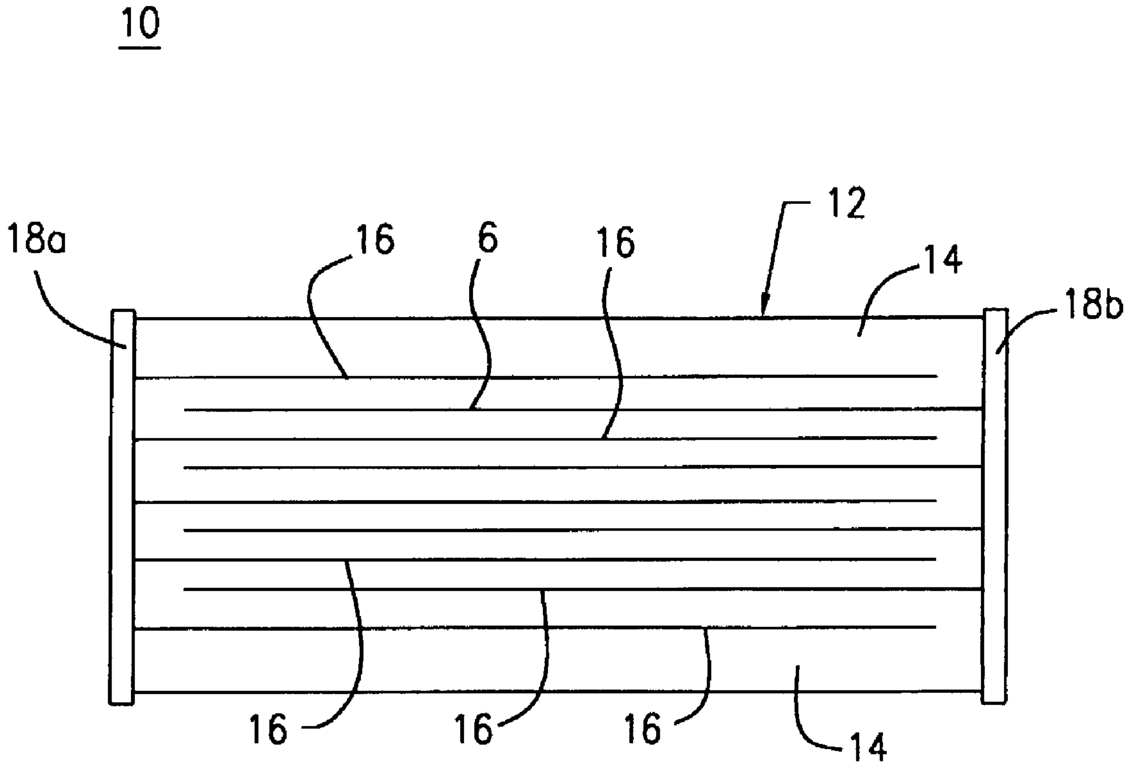
FIG. 1 is a schematic representation of an embodiment of the monolithic PTC thermistor of the present invention.

Example $BaCO_3$, $TiO_2$, $Sm_2O_3$, and $SiO_2$, serving as raw materials, were mixed in the compositional proportion to form $$(Ba_{0.998}Sm_{0.002})_{1.002}TiO_3+0.001SiO_2.$$

The resultant powder was pulverized by use of a zirconia ball for five hours, and the resultant powder was calcined at 1,100° C. for two hours. The thus-calcined product was mixed with an organic binder, and the mixture was shaped into a sheet. Ni serving as an internal electrode was printed on the sheet. The resultant sheets were laminated with one another, and the thus-obtained laminate was fired in a reducing atmosphere ($H_2$+$N_2$). Thereafter, Ni external electrodes were formed on the laminate through baking at 500–800° C. in air, simultaneously with re-oxidation of the semiconducting ceramic material, to thereby produce a monolithic PTC thermistor 10 as shown in FIG. 1. The monolithic PTC thermistor 10 shown in FIG. 1 comprises a laminate 12. The laminate 12 comprises semiconducting ceramic materials 14 formed of the aforementioned raw materials, and internal electrodes 16, the materials 14 and the electrodes 16 being alternately laminated. As shown in FIG. 1, the internal electrodes 16 extend to first and second side surfaces of the laminate 12 on which are formed external electrodes 18*a* and 18*b*, respectively, and the electrodes 16 are electrically connected to the external electrodes 18*a* and 18*b*.

The sintering completion temperature of the above semiconducting ceramic material is 1,300° C. In Example 1, Example 2, Example 3 and Comparative Example, the firing temperatures of the ceramic material are 1,150° C., 1,200° C., 1,250° C. and 1,300° C., respectively. Table 1 shows firing temperature, re-oxidation temperature, mean grain size, and relative density for each ceramic material. Table 1 also shows the resistance of the monolithic PTC thermistor comprising the ceramic material at room temperature; the logarithm of the maximum resistance of the PTC thermistor ($R_{max}$) to the resistance thereof at 25° C. ($R_{25}$); i.e., log ($R_{max}/R_{25}$); and the withstand voltage of the PTC thermistor. The re-oxidation temperature of each semiconducting ceramic material was optimized on the basis of the firing temperature thereof. In the Comparative Example, the semiconducting ceramic material was re-oxidized at 800° C., which is the upper limit for preventing oxidation of Ni.

TABLE 1

| | Firing temperature (° C.) | Re-oxidation temperature (° C.) | Mean grain size (μm) | Relative density (%) | Resistance at room temperature (Ω) | log ($R_{max}/R_{25}$) | Withstand voltage (V) |
|---|---|---|---|---|---|---|---|
| Example 1 | 1150 | 550 | 0.8 | 85 | 0.15 | 3.5 | 15 |
| Example 2 | 1200 | 680 | 1.0 | 88 | 0.12 | 3.4 | 14 |
| Example 3 | 1250 | 750 | 1.5 | 90 | 0.11 | 3.0 | 12 |
| Comparative Example | 1300 | 800 | 8 | 94 | 0.10 | 1.0 | 2.5 |

As is apparent from Table 1, when the semiconducting ceramic material is fired at a temperature about 25° C. or more lower than the sintering completion temperature, the ceramic material exhibits excellent PTC characteristics. Particularly when the semiconducting ceramic material is fired at about 1,250° C. or lower, the ceramic material exhibits remarkably excellent PTC characteristics.

The present invention provides the $BaTiO_3$-type semiconducting ceramic material which exhibits excellent PTC characteristics, the ceramic material having undergone firing in a reducing atmosphere and re-oxidation.

The present invention also provides the process for producing the $BaTiO_3$-type semiconducting ceramic material which exhibits excellent PTC characteristics, which comprises firing the ceramic material in a reducing atmosphere and re-oxidizing the ceramic material.

The present invention also provides a thermistor comprising the $BaTiO_3$-type semiconducting ceramic material which exhibits excellent PTC characteristics, the ceramic material having undergone firing in a reducing atmosphere and re-oxidation.

What is claimed is:

1. A process for producing a $BaTiO_3$ semiconducting ceramic which comprises firing a calcined $BaTiO_3$ ceramic material in a reducing atmosphere at a temperature about 25° C. or more lower than the sintering completion temperature of the ceramic material, wherein the sintering completion temperature is the temperature at which the ceramic material when sintered has the greatest density, and then re-oxidizing the ceramic material in air at a temperature about 500° C. or more lower than the firing temperature, wherein the $BaTiO_3$ semiconducting ceramic exhibits the characteristics of positive temperature coefficient of resistance.

2. The process for producing a $BaTiO_3$ semiconducting ceramic according to claim 1, wherein the $BaTiO_3$ ceramic material has a sintering completion temperature of about 1,275° C. or higher and is fired at about 1,250 °C. or lower.

3. The process for producing a $BaTiO_3$ semiconducting ceramic according to claim 2, wherein the $BaTiO_3$ ceramic material is fired at temperature which is within about 150° C. of its sintering completion temperature and is at least about 25° C. lower than the sintering completion temperature.

4. The process for producing a $BaTiO_3$ semiconducting ceramic according to claim 3, wherein the size of grains constituting the matrix of a semiconducting ceramic material fired and re-oxidized is about 0.5–2 μm.

5. The process for producing a $BaTiO_3$ semiconducting ceramic according to claim 4, wherein the size of grains constituting the matrix of a semiconducting ceramic material fired and re-oxidized is about 0.7–1.5 μm.

6. The process for producing a $BaTiO_3$ semiconducting ceramic according to claim 5, wherein the $BaTiO_3$ ceramic material is fired and re-oxidized for times such that the relative density is about 85–90%.

7. The process for producing a $BaTiO_3$ semiconducting ceramic according to claim 1, wherein the size of grains constituting the matrix of a semiconducting ceramic material fired and re-oxidized is about 0.5–2 $\mu$m.

8. The process for producing a $BaTiO_3$ semiconducting ceramic according to claim 1, wherein the size of grains constituting the matrix of a semiconducting ceramic material fired and re-oxidized is about 0.7–1.5 $\mu$m.

9. The process for producing a $BaTiO_3$ semiconducting ceramic according to claim 1, wherein the $BaTiO_3$ ceramic material is fired and re-oxidized for times such that the relative density is about 85–90%.

10. The process for producing a $BaTiO_3$ semiconducting ceramic according to claim 9, wherein the $BaTiO_3$ ceramic material is fired and re-oxidized for times such that the relative density is about 87–89%.

11. The process for producing a $BaTiO_3$ semiconducting ceramic according to claim 1, wherein the $BaTiO_3$ ceramic material is fired at temperature which is within about 150° C. of its sintering completion temperature and which is at least about 25° C. lower than the sintering completion temperature.

12. The process for producing a $BaTiO_3$ semiconducting ceramic according to claim 11, wherein the size of grains constituting the matrix of a semiconducting ceramic material fired and re-oxidized is about 0.5–2 $\mu$m.

13. The process for producing a $BaTiO_3$ semiconducting ceramic according to claim 12, wherein the size of grains constituting the matrix of a semiconducting ceramic material fired and re-oxidized is about 0.7–1.5 $\mu$m.

14. The process for producing a $BaTiO_3$ semiconducting ceramic according to claim 13, wherein the $BaTiO_3$ ceramic material is fired and re-oxidized for times such that the relative density is about 85–90%.

15. The process for producing a $BaTiO_3$ semiconducting ceramic according to claim 1, wherein the $BaTiO_3$ ceramic material fired is re-oxidized at a temperature of 500–800 °C. in air.

16. A process for producing a $BaTiO_3$ semiconducting ceramic which comprises firing a calcined $BaTiO_3$ ceramic material in a reducing atmosphere and at a temperature which is within about 150° C. of its sintering completion temperature and about 25° C. or more lower than the sintering completion temperature of the ceramic material, wherein the sintering completion temperature is the temperature at which the ceramic material when sintered has the greatest density, and then re-oxidizing the ceramic material in air at a temperature about 500° C. or more lower than the firing temperature, wherein the calcined $BaTiO_3$ semiconducting ceramic exhibits the characteristics of positive temperature coefficient of resistance, and wherein the calcined $BaTiO_3$ ceramic material is fired and re-oxidized for times such that the relative density is about 85–90% and the size of grains constituting the matrix of a semiconducting ceramic material fired and re-oxidized is about 0.5–2 $\mu$m.

17. The process for producing a $BaTiO_3$ semiconducting ceramic according to claim 16, wherein the size of grains constituting the matrix of a semiconducting ceramic material fired and re-oxidized is about 0.7–1.5 $\mu$m.

18. The process for producing a $BaTiO_3$ semiconducting ceramic according to claim 17, wherein the $BaTiO_3$ ceramic material has a sintering completion temperature of about 1,275° C. or higher and is fired at about 1,250° C. or lower.

* * * * *